(12) United States Patent
Deshmukh et al.

(10) Patent No.: US 11,665,094 B2
(45) Date of Patent: May 30, 2023

(54) COLLECTING, PROCESSING, AND DISTRIBUTING TELEMETRY DATA

(71) Applicant: VMware, Inc., Palo Alto, CA (US)

(72) Inventors: Siddhant Deshmukh, Sunnyvale, CA (US); Benjamin C. Basler, Los Altos, CA (US); Rohan Agarwal, Los Altos Hills, CA (US); Srikanth Hariharan, Sunnyvale, CA (US); Akash Gangil, Los Gatos, CA (US)

(73) Assignee: VMWARE, INC., Palo Alto, CA (US)

( * ) Notice: Subject to any disclaimer, the term of this patent is extended or adjusted under 35 U.S.C. 154(b) by 40 days.

(21) Appl. No.: 17/107,718

(22) Filed: Nov. 30, 2020

(65) Prior Publication Data

US 2022/0174012 A1 Jun. 2, 2022

(51) Int. Cl.
*H04L 45/745* (2022.01)
*H04L 67/1097* (2022.01)
*H04L 43/062* (2022.01)

(52) U.S. Cl.
CPC .......... *H04L 45/745* (2013.01); *H04L 43/062* (2013.01); *H04L 67/1097* (2013.01)

(58) Field of Classification Search
CPC .. H04L 45/745; H04L 43/062; H04L 67/1097
See application file for complete search history.

(56) References Cited

U.S. PATENT DOCUMENTS

| | | | |
|---|---|---|---|
| 7,043,564 B1 * | 5/2006 | Cook | H04L 61/255 709/245 |
| 9,246,703 B2 | 1/2016 | Yu et al. | |
| 9,547,518 B2 | 1/2017 | Higuchi et al. | |
| 9,749,718 B1 * | 8/2017 | Friel | H04Q 9/00 |
| 10,887,361 B2 | 1/2021 | Jiang et al. | |
| 10,887,386 B2 | 1/2021 | Han et al. | |
| 10,963,333 B1 * | 3/2021 | Nijim | G06F 11/3006 |
| 11,075,847 B1 * | 7/2021 | Kwan | H04L 47/283 |
| 11,212,219 B1 * | 12/2021 | Iorga | H04L 69/16 |
| 11,343,162 B2 * | 5/2022 | Rangarajan | H04L 43/12 |

(Continued)

OTHER PUBLICATIONS

Buyya, Rajkumar, et al., "A Case of Peering of Content Delivery Networks," IEEE Distributed Systems Online, Oct. 2006, 5 pages, vol. 7, No. 10, IEEE Computer Society.

(Continued)

*Primary Examiner* — Christopher M Crutchfield
*Assistant Examiner* — Tito Q Pham
(74) *Attorney, Agent, or Firm* — Adeli LLP

(57) ABSTRACT

Some embodiments of the invention provide a method of reporting telemetry data in a telecommunication network. The telemetry data is collected from a set of one or more telemetry-producing (TP) network elements and is distributed to a set of one or more telemetry-consuming (TC) network elements registered to receive the telemetry data. The method receives a telemetry packet produced by a TP network element and performs a filtering operation to determine whether the telemetry packet should be reported to at least a subset of one or more TC network elements. When the filtering operations result in a determination that the telemetry packet should be reported, the method forwards the telemetry packet to the subset of TC network elements.

16 Claims, 7 Drawing Sheets

(56) References Cited

U.S. PATENT DOCUMENTS

| | | | |
|---|---|---|---|
| 11,367,356 B1* | 6/2022 | Ketharaju | B60W 60/0025 |
| 2004/0218603 A1 | 11/2004 | Lee et al. | |
| 2005/0270982 A1 | 12/2005 | McBeath | |
| 2006/0143300 A1 | 6/2006 | See et al. | |
| 2007/0243822 A1* | 10/2007 | Monte | H04B 7/2041 |
| | | | 455/12.1 |
| 2010/0138888 A1 | 6/2010 | Kawada et al. | |
| 2014/0029451 A1 | 1/2014 | Nguyen | |
| 2015/0016286 A1 | 1/2015 | Ganichev et al. | |
| 2015/0117445 A1 | 4/2015 | Koponen et al. | |
| 2015/0263897 A1 | 9/2015 | Ganichev et al. | |
| 2015/0381484 A1 | 12/2015 | Hira et al. | |
| 2016/0087859 A1 | 3/2016 | Kuan et al. | |
| 2016/0234296 A1 | 8/2016 | Zucca | |
| 2017/0302569 A1* | 10/2017 | Ramaswamy | H04L 45/32 |
| 2018/0006930 A1 | 1/2018 | Du et al. | |
| 2018/0048519 A1* | 2/2018 | Outhred | H04L 69/163 |
| 2018/0124139 A1 | 5/2018 | Jiang et al. | |
| 2018/0124171 A1 | 5/2018 | Han et al. | |
| 2018/0281598 A1* | 10/2018 | Shu | G05B 19/042 |
| 2019/0038225 A1* | 2/2019 | Leavitt | G16H 10/60 |
| 2019/0306228 A1* | 10/2019 | Lau | H04L 45/46 |
| 2020/0184702 A1* | 6/2020 | Shah | G06F 9/5077 |
| 2020/0349045 A1* | 11/2020 | Van De Groenendaal | |
| | | | G06F 11/34 |
| 2021/0103830 A1* | 4/2021 | Liu | H04W 72/04 |
| 2021/0160228 A1* | 5/2021 | Scott | H04W 4/025 |
| 2021/0194894 A1* | 6/2021 | Anderson | H04L 63/1425 |
| 2021/0218647 A1* | 7/2021 | Rangarajan | H04L 43/026 |
| 2021/0218651 A1* | 7/2021 | Rangarajan | H04W 24/10 |
| 2021/0226863 A1* | 7/2021 | Nucci | H04L 41/085 |
| 2021/0250831 A1* | 8/2021 | Froehlich | H04W 36/14 |
| 2021/0281514 A1* | 9/2021 | Guo | H04L 43/087 |

OTHER PUBLICATIONS

Dasilva, Luiz A., et al., "Customized Services over Virtual Wireless Networks: The Path towards Networks without Borders," Proceedings of Future Network & Mobile Summit 2013, Jul. 3-5, 2013, 10 pages, IIMC, Lisbon, Portugal.

Majhi, Santosh Kumar, et al., "A Security Context Migration Framework for Virtual Machine Migration," 2015 International Conference on Computing and Network Communications (CoCoNet '15), Dec. 16-19, 2015, 5 pages, Trivandrum, IN.

* cited by examiner

COLLECTING, PROCESSING, AND DISTRIBUTING TELEMETRY DATA

BACKGROUND

Telecommunication networks collect telemetry data regarding the operation of elements in these networks. Examples of such network elements include eNodeB, gNodeB, and mobility management entity (MME) in a radio access network (RAN). These components enable communication services. Since these elements are in the network datapath, they contain useful signaling and telemetry data, which can be analyzed to gain insights into network performance and discover methods to increase network operation efficiency. Examples of such telemetry data include cell trace records (CTRs) and cell trace UE (user equipment) mappings (CTUMs).

This data can be sent to external systems over TCP by configuring destination network endpoints (IP:Port) in a management interface which manages these elements. Currently, configuring multiple destinations to send this data is problematic due to several reasons. For instance, the number of destinations to which data can be sent is very limited, sometimes just one. Also, telemetry and user traffic often share the same datapath, and congestion caused by telemetry can have an undesirable impact on user traffic.

BRIEF SUMMARY

Some embodiments of the invention provide a method of reporting telemetry data in a telecommunication network. The telemetry data is collected from a set of one or more telemetry-producing (TP) network elements and is distributed to a set of one or more telemetry-consuming (TC) network elements registered to receive the telemetry data. The method receives a telemetry packet produced by a TP network element and performs a filtering operation to determine whether the telemetry packet should be reported to at least a subset of one or more TC network elements. When the filtering operations result in a determination that the telemetry packet should be reported, the method forwards the telemetry packet to the subset of TC network elements.

In some embodiments, the method is implemented by a set of one or more telemetry-processing machines (e.g., virtual machines, containers, appliances, etc.) that receive telemetry packets produced by several TP network elements. This set of machines performs filtering operations to identify which of the received telemetry packets should be reported to one or more subsets of TC network elements registered to receive telemetry packets. Based on the filtering operations, the set of machines forward different sets of telemetry packets to different subsets of TC network elements. The method establishes a layer 4 (L4) connection session with each registered TC network element and forwards telemetry packets to each TC network element along the L4 connection session established with the TC network element.

In some embodiments, the telemetry packets are sent to the set of telemetry processing machines by packet mirrors placed in the data path of packets. The packet mirrors in some embodiments send copies of the telemetry packets to the set of telemetry processing machines through a separate network (e.g., the Internet) than the telecommunication network in which the TP network elements operate. Also, in some embodiments, the telemetry packets are forwarded along their data paths in the telecommunication network (e.g., a radio access network) to destinations specified in the telemetry packets, while the sets of telemetry packets that are forwarded by the set of machines to the registered TC network elements are sent through a separate network (e.g., the Internet) and in separate connection streams (e.g., TCP streams) to the TC network elements.

The method in some embodiments partitions the telemetry packets into different groups before performing its filtering operation. The method in some embodiments performs different filtering operations for different groups based on different sets of filtering criteria that are specified for the different groups. In some embodiments, the method receives, from a set of one or more administrators, configuration data that specifies a set of filtering criteria for each group and a set of destination addresses for the set of registered TC network elements for each group. The configuration data in some embodiments also specifies a set of data partitioning criteria for defining different groups of received telemetry packets.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of reporting telemetry data in a telecommunication network. The telemetry data is collected from a set of one or more telemetry-producing (TP) network elements and is distributed to a set of one or more telemetry-consuming (TC) network elements registered to receive the telemetry data. The method receives a telemetry packet produced by a TP network element and performs a filtering operation to determine whether the telemetry packet should be reported to at least a subset of one or more TC network elements. When the filtering operations result in a determination that the telemetry packet should be reported, the method forwards the telemetry packet to the subset of TC network elements.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

The method of some embodiments is implemented by a set of one or more telemetry-processing machines (e.g., virtual machines, containers, appliances, etc.) that receive telemetry packets produced by several TP network elements. This set of machines performs filtering operations to identify which of the received telemetry packets should be reported to one or more subsets of TC network elements registered to receive telemetry packets. Based on the filtering operations, the set of machines forward different sets of telemetry packets to different subsets of TC network elements. The method establishes a layer 4 (L4) connection session with each registered TC network element and forwards telemetry packets to each TC network element along the L4 connection session established with the TC network element.

Figure 1:
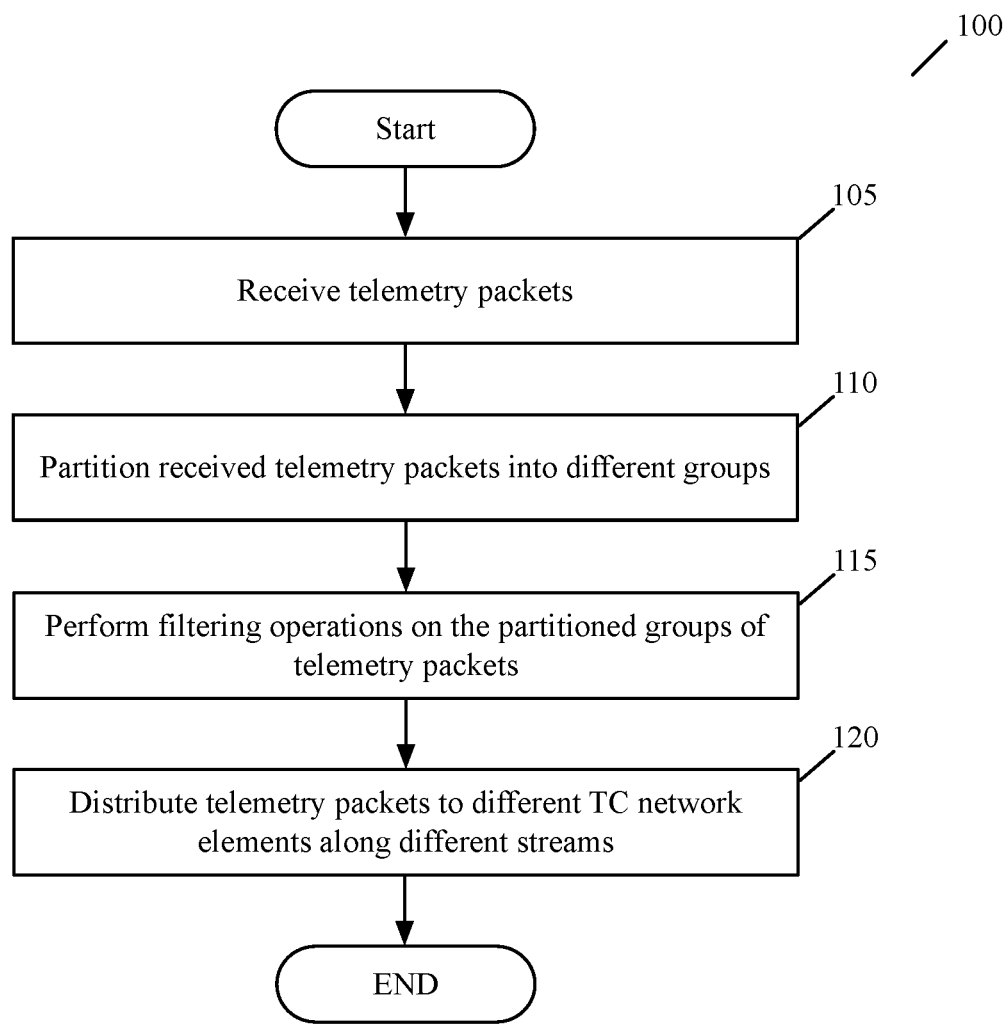
FIG. 1 illustrates a process performed by telemetry processing machines in some embodiments.

FIG. 1 illustrates a process 100 performed by the telemetry processing machines in some embodiments. This process will be explained by reference to FIG. 2, which illustrates an example of a telemetry processing system 200 receiving, analyzing, and distributing telemetry packets from a radio access network (RAN) component 210 of a telecommunication network 205.

Figure 2:
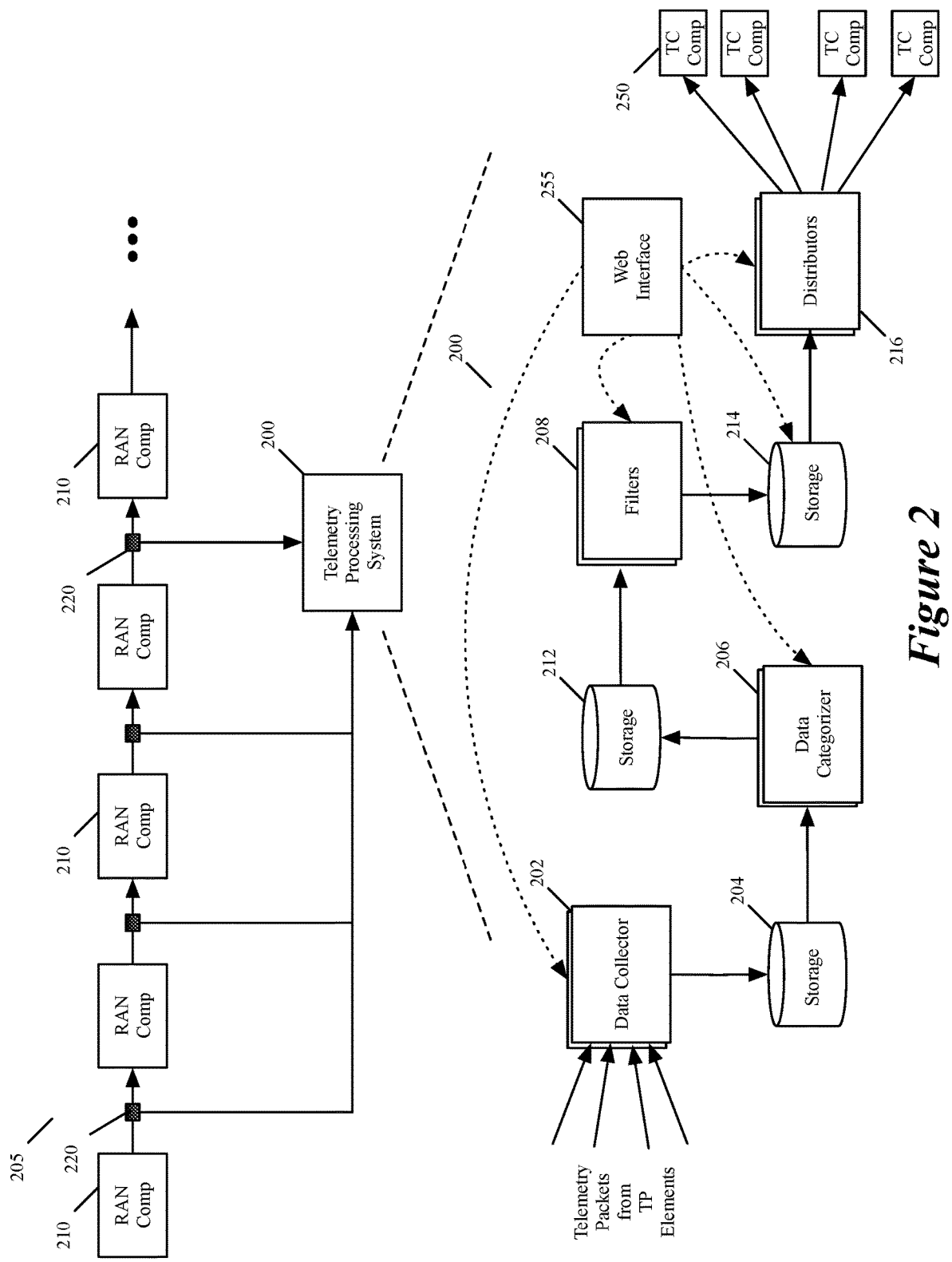
FIG. 2 illustrates an example of a telemetry processing system receiving, analyzing, and distributing telemetry packets from a radio access network (RAN) component of a telecommunication network.

As shown, the process 100 starts when it receives (at 105) several telemetry packets produced by several TP network elements. In the example of FIG. 2, the telemetry processing system 200 receives the telemetry packets from packet mirrors 220 deployed in the data path of several RAN components 210 of the telecommunication network 205. As shown, the telemetry processing system 200 in some embodiments includes data collectors 202 (e.g., data collecting VMs or containers) that receive the telemetry packets forwarded by the packet mirrors, and store the received packets in one or more storages 204. In some embodiments, the packet mirrors 220 forward the telemetry packets to the data collectors 202 through the Internet (e.g., through TCP connections with the data collectors 202, or front end load balancers (not shown) that distribute the telemetry packets to the data collectors 202, as further described below).

Each packet mirror 220 is deployed in an egress data path of a RAN component 210 so that it can identify each telemetry packet, copy each identified telemetry packet, forward each copied telemetry packet to the telemetry processing system 200, and allow each original telemetry packet to traverse to its destination (e.g., the destination specified in the telemetry packet's header). A telemetry packet in some embodiments is any trace (signaling, traffic, headers) that is sent by nodes in the LTE or 5G network (example, eNodeBs, MME, gNB). Examples of telemetry packets in some embodiments include CTR, CTUM and NR-CTR packets, which are processed to gain insight into network performance.

For instance, in some embodiments, the data in the telemetry packet is used to quantify network and subscriber performance and the quality of the telemetry itself. For instance, apart from distributing the data, we have a stream processing system that computes real-time KPIs (throughput, latency, etc.) and allows development of ML/AI applications leveraging the real-time KPIs. Examples of RAN components 210 in some embodiments include eNodeB components, gNodeB components, and MMEc components.

In some embodiments, the packet mirrors 220 forward a copy of each identified telemetry packet to the telemetry processing system 200, while in other embodiments, the packet mirrors 220 forward copies of only a sampled set of the identified telemetry packets to the telemetry processing system 200. The packet mirrors 220 in some embodiments are deployed on the same devices (e.g., computers) as their associated network components (i.e., the components sending the packets that the mirrors copy and forward), and/or are deployed separately from their associated network components along their egress data paths.

At 110, the process 100 partitions the received telemetry packets into different groups before performing its filtering operation. In the example of FIG. 2, the telemetry processing system 200 includes telemetry categorizers 206 (e.g., telemetry-categorizing VMs or containers) that partition the collected telemetry packets into several groups of related telemetry packets. The telemetry categorizers 206 perform this partitioning in real-time in some embodiments, while performing this operation periodically in other embodiments.

In some embodiments, this partitioning is based on keys (e.g., Kafka database "topics") defined by one or more administrators. Each group is associated with a set of one or more keys. Each received telemetry packet's set of attributes (e.g., the set of RAN component identifiers associated with the packet, such as the source RAN component identifier or type) is compared with each group's set of keys, and is placed in the group that has the set of keys that matches the packet's set of attributes. Each group of telemetry packets in some embodiments is stored in a different storage structure 212 (e.g., different table, database, etc.). In other embodiments, each group is created by associating a group identifier with each packet.

Next, at 115, the process 100 performs filtering operations to identify which of the received telemetry packets should be reported to one or more subsets of TC network elements registered to receive telemetry packets. In the example of FIG. 2, the telemetry processing system 200 includes telemetry filters 208 (e.g., filtering VMs or containers) that perform filtering operations for the different groups of collected telemetry packets. The telemetry filters 208 perform their filtering operations in real-time as the packets are partitioned in some embodiments, while in other embodiments, they perform their filter operations periodically.

In some embodiments, the telemetry filters 208 store the telemetry packets that they do not discard as a result of their filtering (i.e., store the packets that remain after the filtering) in a set of one or more storages 214. In some embodiments, different filtering operations can be performed for the different groups of collected telemetry packets by using different sets of filtering criteria for the different groups. In some embodiments, the method receives, from a set of one or more administrators, configuration data that specifies a set of filtering criteria for each group and a set of destination addresses for the set of registered TC network elements for each group. The configuration data in some embodiments also specifies a set of data partitioning criteria for defining different groups of received telemetry packets.

In some embodiments, each telemetry packet has the following attributes: (1) node identifier, (2) event identifier, (3) device type, and (4) IMSI. An administrator in some embodiments can predicate the filtering based on any combination of these attributes. For instance, the filtering can be based on node and event identifiers such that only telemetry packets with a particular combination of node and event identifiers are not filtered out (i.e., are not discarded by the filtering operation). In some embodiments, event and node identifiers are string identifiers used to identify events and nodes (e.g., eNodeB, gNodeB, MME). The filtering criteria can also be based on a device type so that only packets with a particular set of one or more device types (e.g., iPhones 11 and 12) are not filtered out. Same follows for IMSI values, but IMSI filtering in some embodiments is only possible with a CTUM feed since only the CTUM feed contains IMSI information.

After the filtering operation (at 115), the process 100 forwards (at 120) the telemetry packets that remain (i.e., that are not discarded as a result of the filtering operation) for each group to the TC network elements that are registered to receive the telemetry packets. In some embodiments, different sets of TC network elements can register to receive different sets of collected telemetry packets. The TC network elements in some embodiments receive the telemetry packets along a different network (e.g., along the Internet) than the telecommunication network (e.g., the radio access network) from which the telemetry packets were collected. The use of a different network for the distribution of the telemetry packets reduces congestion in the telemetry network.

For instance, in some embodiments, the TC network elements receive the telemetry packets along TCP or UDP streams passing through TCP or UDP connections between the telemetry processing machines and the TC network elements. In the example of FIG. 2, the telemetry processing system 200 includes a set of TCP distributors 216 (e.g., telemetry-distributing VMs or containers) that (1) retrieve remaining telemetry packets stored in the storage 214 after the filtering operations and (2) forward the telemetry packets to TC network elements 250 registered to receive the telemetry packets along different TCP streams to these network elements.

Alternatively, instead of having different machines perform the filtering and distributing of the telemetry packets, other embodiments have one set of machines perform both of these operations (i.e., perform the filtering operation as part of the telemetry packet distribution operation). In such embodiments, the telemetry packets that are not filtered out for a configured telemetry distribution stream after the filtering operation are forwarded in real-time to the TC network components that registered for this stream.

One or more components of the telemetry processing system (e.g., the data collectors 202, the data categorizers 206, the filters 208, and the distributors 216) are configurable through a web interface 255 of the telemetry processing system 200 of some embodiments. This interface 255 is supported by a set of web servers (not shown) of the telemetry processing system 200. Through the web interface 255, administrators can configure multiple "feed distributions" as well as configure the criteria for grouping the telemetry packets.

In some embodiments, each feed distribution that is configured through the web interface 255 can be defined by reference to predicates on which the filtering is done. In some embodiments, the filtering can be done along one of several dimensions. For instance, a feed distribution can be specified in terms of one or more node identifiers and event identifiers. Only telemetry packets with that combination of node and event identifiers are sent downstream to the TC network elements specified for that feed. The rest of the telemetry packets are not selected (e.g., are filtered and dropped) for this feed.

A feed distribution can also be specified in terms of device type. When the feed distribution is specified in terms of device type (e.g., the type of smartphone), only packets from devices that have device types that match the registered feed's device type are forwarded (and the rest filtered) to the TC network elements registered for the feed. In addition, a feed distribution can be specified in terms of IMSI values. In some embodiments, IMSI filtering is only possible with a CTUM feed since only the CTUM feed contains IMSI information.

Figure 3:
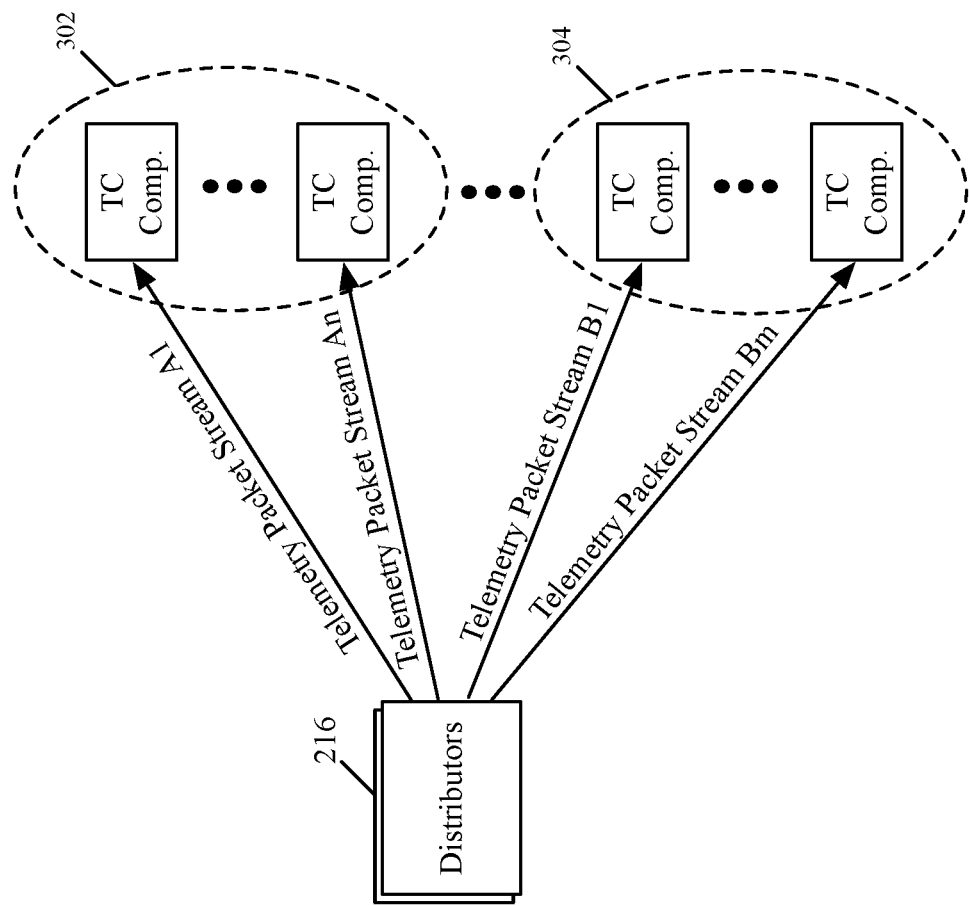
FIG. 3 illustrates an example of different telemetry-consuming network elements receiving two different streams of telemetry packets.

FIG. 3 illustrates an example of different TC network elements 302 and 304 receiving two different streams of telemetry packets from the TCP distributors 216. In this example, each network element in a first set of TC network elements 302 receives the same stream of telemetry packets associated with a particular combination of event and node identifiers. Each such network element has one or more TCP connections with one or more TCP distributors 216 through which it receives the stream of telemetry packets.

Similarly, each network element in a second set of TC network elements 304 receives the same stream of telemetry packets associated with a particular device type (e.g., iPhone 11s) through one or more TCP connections with one or more TCP distributors 216. In some embodiments, one or more TC network elements can be part of both the first and second sets of TC network elements 302 and 304. Many other streams of telemetry packets to the same or different sets of TC network elements can be specified through the web interface of the telemetry processing system 200 of some embodiments.

Figure 4:
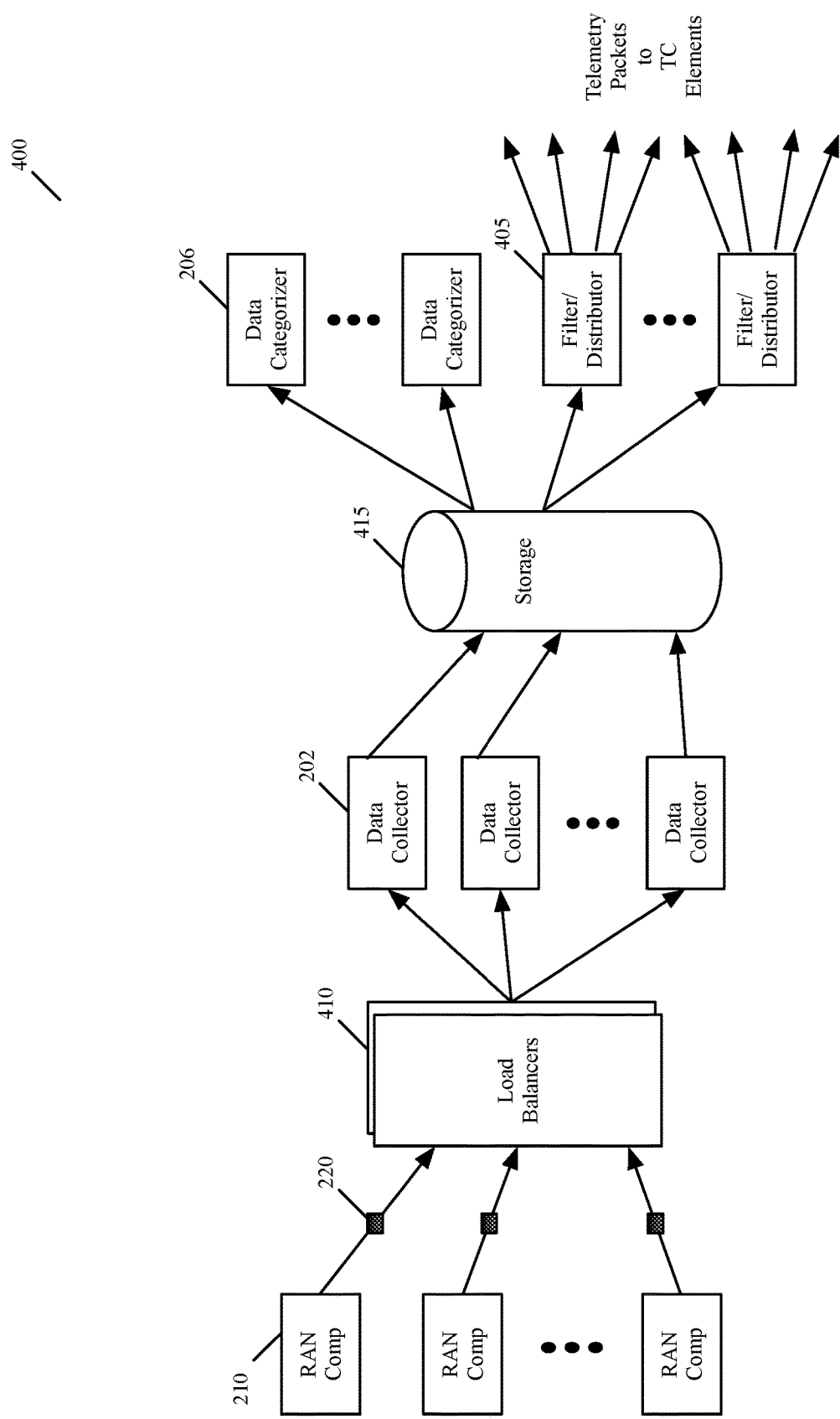
FIG. 4 illustrates a more specific example of a telemetry processing system of some embodiments.

FIG. 4 illustrates a more specific example of a telemetry processing system 400 of some embodiments. Like, the telemetry processing system 200, the telemetry processing system 400 includes telemetry collectors 202 and telemetry categorizers 206. The system 400 also includes telemetry distributors 405 that perform the filtering and distributing operations of the telemetry filters 208 and distributors 216. In this example, the various collectors 202, categorizers 206, and distributors 405 share a set of one or more databases 415 in which the collected and processed telemetry packets are stored before streaming. The telemetry processing system 400 also includes front end load balancers 410 that receive telemetry packets from the packet mirrors 220 through TCP connections with these mirrors 220. These front end load balancers 410 distribute the received telemetry packets across the telemetry collectors 202, which then store the telemetry packets in the set of databases 415.

Figure 5:
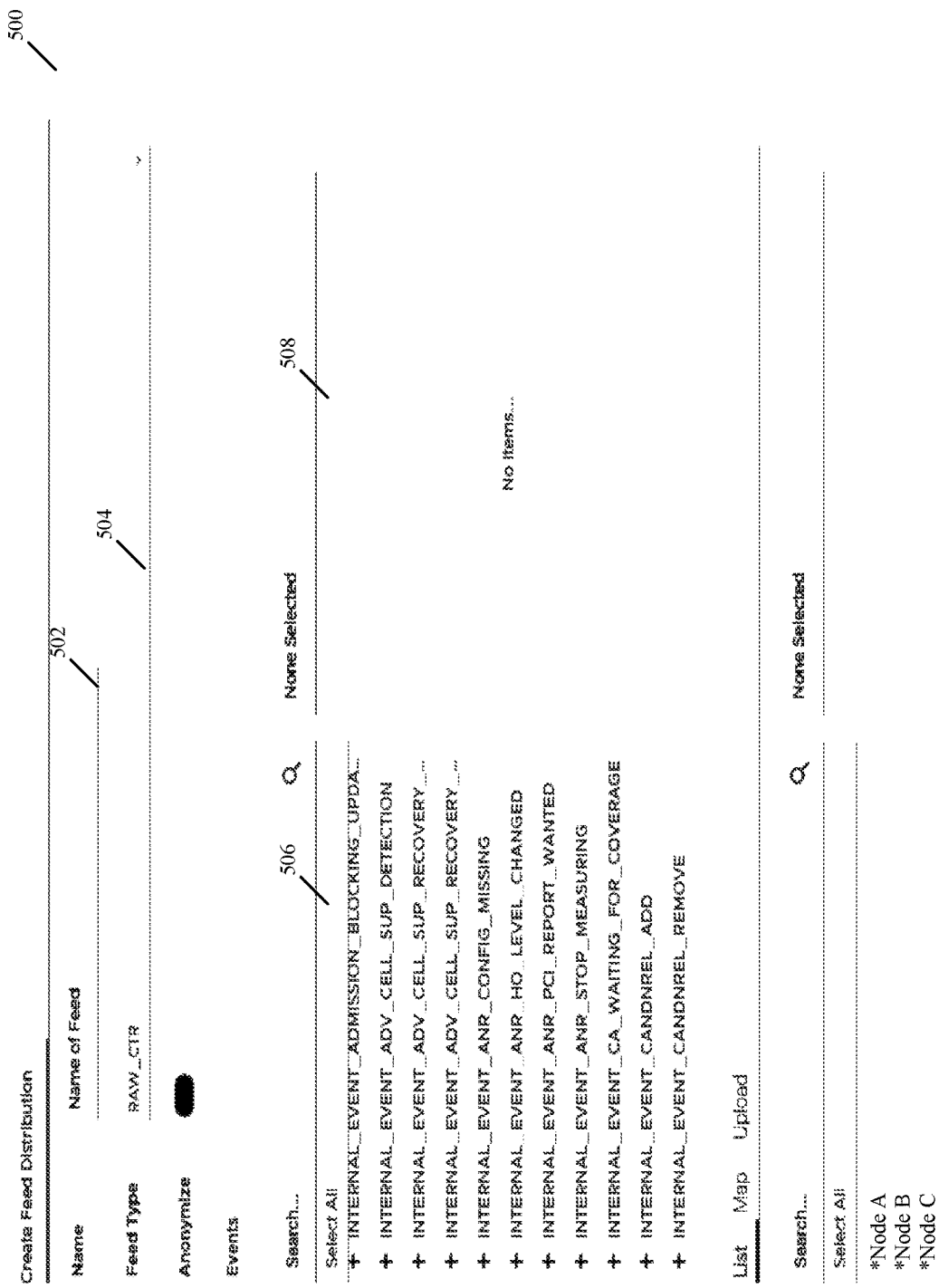
FIGS. 5-6 illustrate a user web interface of some embodiments through which an administrator can create one or more telemetry distribution feeds for the telemetry processing system.
Figure 6:
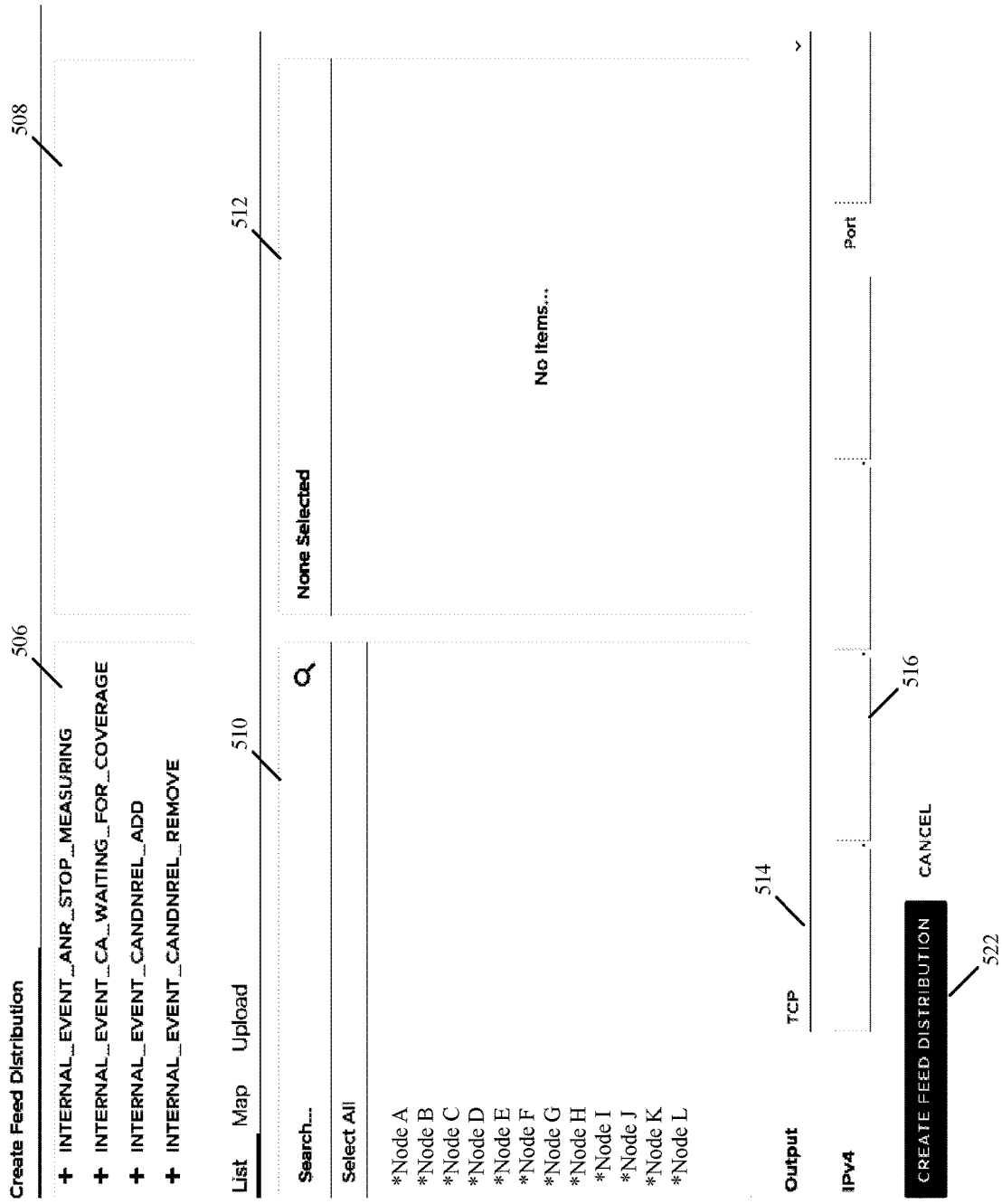

FIGS. 5-6 illustrate a user web interface 500 of some embodiments through which an administrator can create one or more telemetry distribution feeds for the telemetry processing system 200. As shown, this user interface 500 has attribute fields 502 and 504 through which the administrator can name the feed and specify the type of feed (e.g., by selecting these fields and typing the name and feed type, and/or typing the name and selecting the feed type through a drop down or other menu control). It also has an event window 506, which provides the type of telemetry events for which telemetry packets should be collected and distributed through the configured distribution feed. In some embodiments, the events displayed in the event window 506 are associated with the type of feed specified in the field 504. When selected (e.g., through a click and drag, or click selection of the add icon for the event) for a configured feed, the events are added to a selected event window 508.

The user interface 500 also includes a window 510, which lists several node ID attributes that can be used to filter the collected telemetry packets. The node IDs are also used to group the data in buckets (e.g., into different Kafka topic partitions). In the illustrated example, the node IDs are displayed with particular administrator assigned names. The user selected nodes for filtering are displayed in window 512.

The UI 500 also has an L4 type field 514 through which an administrator can specify the L4 connection stream to establish with the TC network elements that are to receive the configured distribution feed. In this example, a TCP connection is selected. The UI 500 further has a set of IP fields 516 through which an administrator can specify IP addresses of the TC network elements that are to receive the configured distribution feeds. Once the administrator specifies the attributes of a telemetry stream through the controls 502-516, the administrator can select the "Create Feed Distribution" control 522 (e.g., through a cursor click operation) to direct the web interface 500 to pass these settings to a set of controllers, which then configure the components of the telemetry processing system 200 to process, filter, and distribute the telemetry packets for this stream to one or more TC network elements specified for this stream.

Figure 7:
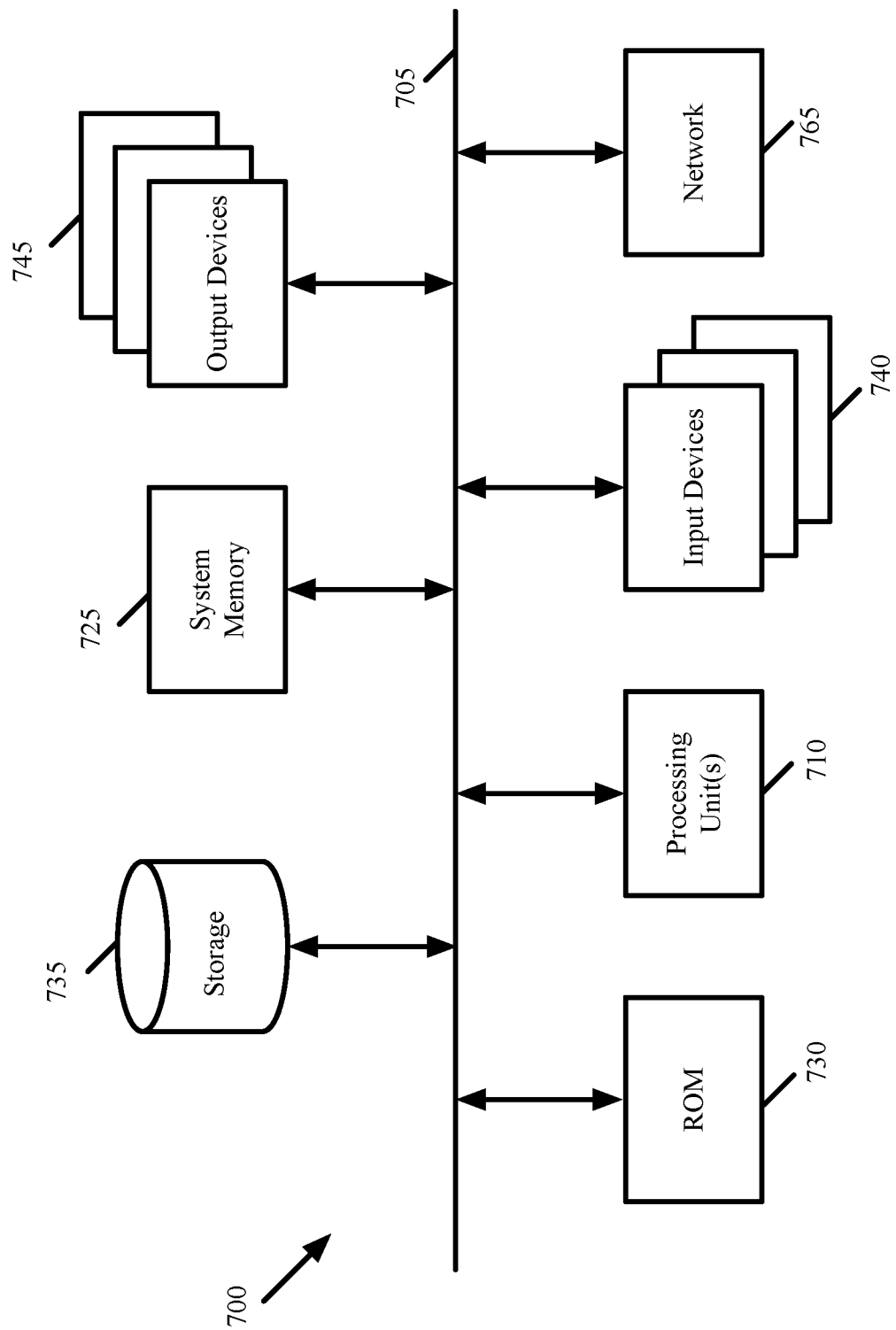
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer-readable media and interfaces for various other types of computer-readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) 710 may be a single processor or a multi-core processor in different embodiments.

The read-only-memory (ROM) 730 stores static data and instructions that are needed by the processing unit(s) 710 and other modules of the electronic system 700. The permanent storage device 735, on the other hand, is a read-and-write memory device. This device 735 is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device 735. Like the permanent storage device 735, the system memory 725 is a read-and-write memory device. However, unlike storage device 735, the system memory 725 is a volatile read-and-write memory, such as a random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices 740 enable the user to communicate information and select commands to the electronic system 700. The input devices 740 include alphanumeric keyboards and pointing devices (also called "cursor control devices"). The output devices 745 display images generated by the electronic system 700. The output devices 745 include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to a microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. For instance, several embodiments were described above for collecting, processing, filtering, and distributing telemetry packets. One of ordinary skill will realize that other embodiments collect, process, filter, and distribute other types of packets. Thus, one of ordinary skill in the art would understand that the invention is not to be limited by the foregoing illustrative details, but rather is to be defined by the appended claims.

The invention claimed is:

1. A method of reporting telemetry data collected from a set of one or more telemetry-producing (TP) network elements in a telecommunication network, to a set of one or more telemetry-consuming (TC) network elements registered to receive the telemetry data, the method comprising:
   receiving a plurality of telemetry packets produced by a plurality of TP network elements;
   grouping the plurality of telemetry packets into different groups;
   performing filtering operations to identify which of the received plurality of telemetry packets should be reported to one or more subsets of TC network elements registered to receive telemetry packets, wherein performing filtering operations comprises performing different filtering operations for different groups based on different sets of filtering criteria that are specified for the different groups; and
   when the filtering operations identify different sets of telemetry packets that should be reported to different subsets of TC network elements, forwarding the different sets of telemetry packets to different subsets of TC network elements.

2. The method of claim 1, wherein the receiving, performing, and forwarding operations are performed at a set of one or more telemetry processing machines that collect telemetry packets, perform filtering operations on the telemetry packets to identify the telemetry packets that have to be forwarded to the TC network elements, and forward the telemetry packets that are identified for forwarding to the TC network elements based on the filtering operations.

3. The method of claim 2, wherein the telemetry packets are sent to the set of telemetry processing machines by packet mirrors placed in the data path of packets, the packet mirrors sending copies of the telemetry packets to the set of telemetry processing machines.

4. The method of claim 3, wherein the telemetry packets are also forwarded along their data paths in the telecommunication network to destinations specified in the telemetry packets, while the sets of telemetry packets that are forwarded to the registered TC network elements are sent in separate connection streams to the TC network elements.

5. The method of claim 4, wherein the connection streams are TCP streams.

6. The method of claim 1 further comprising:
   receiving, from a set of one or more administrators, configuration data specifying a set of filtering criteria for each group and a set of destination addresses for the set of registered TC network elements for each group.

7. The method of claim 6, wherein the configuration data further specifies a set of criteria for defining different groups of received telemetry packets.

8. The method of claim 1, wherein forwarding different sets of telemetry packets to different subsets of TC network elements comprises:
   establishing a layer 4 (L4) connection session with each registered TC network element; and
   forwarding telemetry packets to each TC network element along the L4 connection session established with the TC network element.

9. A system for reporting telemetry data collected from a set of one or more telemetry-producing (TP) network elements in a telecommunication network, to a set of one or more telemetry-consuming (TC) network elements registered to receive the telemetry data, the system comprising:
   a set of one or more data collectors to receive a plurality telemetry packet produced by a TP network element;

a set of one or more packet partitioners to partition the plurality of telemetry packets into different groups;

a set of one or more filters to perform a filtering operation to determine which of the plurality of telemetry packet should be reported to at least a subset of one or more TC network elements, wherein at least two different filters for two different groups perform different filtering operations based on two different sets of filtering criteria that are specified for the two different groups;

a set of one or more distributors to distribute any particular telemetry packet to the subset of TC network elements when the filtering operations result in a determination that the particular telemetry packet should be reported.

10. The system of claim 9, wherein the data collector set receives the plurality of telemetry packets produced by a plurality of TP network elements;

the filter set performs filtering operations to determine which of the received plurality of telemetry packets should be reported to one or more subsets of TC network elements registered to receive telemetry packets; and the distributor set forwards, based on the filtering operations, different sets of telemetry packets to different subsets of TC network elements.

11. The system of claim 9, wherein the telemetry packets are sent to the system by packet mirrors placed in the data path of packets, the packet mirrors sending copies of the telemetry packets.

12. The system of claim 11, wherein the telemetry packets are also forwarded along their data paths in the telecommunication network to destinations specified in the telemetry packets, while the sets of telemetry packets that are forwarded to the registered TC network elements are sent in separate connection streams to the TC network elements.

13. The system of claim 12, wherein the connection streams are TCP streams.

14. The system of claim 9 further comprising an interface to receive, from a set of one or more administrators, configuration data specifying a set of filtering criteria for each group and a set of destination addresses for the set of registered TC network elements for each group.

15. The system of claim 14, wherein the configuration data further specifies a set of criteria for defining different groups of received telemetry packets.

16. The system of claim 9, wherein the distributor set forwards different sets of telemetry packets to different subsets of TC network elements by establishing a layer 4 (L4) connection session with each registered TC network element, and forwarding telemetry packets to each TC network element along the L4 connection session established with the TC network element.

* * * * *